United States Patent
Breaux et al.

(10) Patent No.: US 8,442,873 B2
(45) Date of Patent: May 14, 2013

(54) ORDER PROCESSING SYSTEM, METHOD AND PROGRAM PRODUCT

(75) Inventors: Douglas N. Breaux, Webster, TX (US); Michael F. Cipriani, Webster, TX (US); Richard C. Jaworski, Houston, TX (US); Steven L. Martin, Houston, TX (US); Michael L. Williams, Seabrook, TX (US)

(73) Assignee: International Business Machines Corporation, Armonk, NY (US)

( * ) Notice: Subject to any disclaimer, the term of this patent is extended or adjusted under 35 U.S.C. 154(b) by 2642 days.

(21) Appl. No.: 10/286,291

(22) Filed: Oct. 31, 2002

(65) Prior Publication Data

US 2004/0088227 A1 May 6, 2004

(51) Int. Cl.
*G06Q 30/00* (2012.01)
*H04L 9/00* (2006.01)

(52) U.S. Cl.
USPC .............................................. 705/27; 705/79

(58) Field of Classification Search ............... 705/27–28
See application file for complete search history.

(56) References Cited

U.S. PATENT DOCUMENTS

| | | | |
|---|---|---|---|
| 5,319,542 A | 6/1994 | King, Jr. et al. | |
| 5,832,460 A | 11/1998 | Bednar et al. | |
| 6,061,665 A | 5/2000 | Bahreman | |
| 6,072,870 A | 6/2000 | Nguyen et al. | |
| 6,178,409 B1 * | 1/2001 | Weber et al. | 705/79 |
| 6,330,575 B1 | 12/2001 | Moore et al. | |
| 6,574,598 B1 * | 6/2003 | Nakatsuyama et al. | 704/260 |
| 2002/0010659 A1 * | 1/2002 | Cruse et al. | 705/28 |
| 2002/0055883 A1 * | 5/2002 | Shiba et al. | 705/26 |
| 2002/0103753 A1 * | 8/2002 | Schimmel | 705/39 |
| 2002/0184110 A1 * | 12/2002 | Shimada | 705/26 |
| 2003/0236776 A1 * | 12/2003 | Nishimura et al. | 707/3 |
| 2004/0030618 A1 * | 2/2004 | Rosenquist | 705/28 |
| 2005/0177435 A1 * | 8/2005 | Lidow | 705/22 |

\* cited by examiner

*Primary Examiner* — Garcia Ade
(74) *Attorney, Agent, or Firm* — Matthew Chung; Hoffman Warnick LLC

(57) ABSTRACT

An order processing system, method, and program product that generates an order receipt based on an order request. The system, method, and program product include a plurality of request handlers for processing different types of order requests. One of the plurality of request handlers is selected to process the order request based on the type of order request. Once processing is complete, an order receipt is generated.

15 Claims, 3 Drawing Sheets

ORDER PROCESSING SYSTEM, METHOD
AND PROGRAM PRODUCT

BACKGROUND OF THE INVENTION

1. Technical Field

The current invention relates to electronic order processing. In particular, this invention provides an order processing system, method, and program product for processing a plurality of order request types using one of a plurality of request handlers.

2. Background Art

Electronic financial transactions are becoming increasingly popular. For example, numerous retailers now offer web sites in which consumers can select and purchase items that are subsequently delivered to the consumer. The popularity of internet commercial transactions is driven by both the increased accessibility for consumers to place orders (available 24 hours, never leave home, etc.), and the substantially reduced costs incurred by the retailers in maintaining an electronic purchasing system when compared to maintaining a physical store.

Because of these benefits, various government offices and service-based businesses are also increasingly seeking to implement electronic transactions. For example, many government agencies desire to offer citizens the opportunity to perform various transactions, including motor vehicle registration renewals, license renewals, records requests, etc. through an electronic system. These systems would beneficially result in both a reduced cost of doing business for the government agency, and an increased satisfaction among citizens dealing with government offices. However, the expertise and expense of implementing these systems can be prohibitive. Additionally, many service providers, retailers, and government entities do not desire to obtain and verify electronic credit card transactions, known as payment processing.

Current implementations also lack the ability to provide order management, or do not allow the user interface to be separated from the order management system. As a result, current systems either lack the necessary functionality, or lack flexibility (including reusability) for many applications. Further, many systems are based on a "shopping cart" model in which the consumer selects physical items with preset prices. However, many government and service-based businesses do not fit well in the "shopping cart" model. Therefore, these systems cannot be used to implement transactions for these entities.

As a result, there exists a need for an order processing system in which the generation of an order request is performed independently from order management and payment processing functions.

SUMMARY OF THE INVENTION

The current invention provides order processing systems, methods, and program products that process a plurality of types of order requests. Specifically, a user creates an order request for a commercial transaction. The order request is received by an input system that has a plurality of input handlers. Based on a protocol and/or format of the order request, a particular input handler is selected. Specifically, each input handler is adapted to receive communications in a particular protocol/format. Once selected, the input handler will transform/convert the request into order data, and then forward the order data to a request system for processing. The request system has a plurality of request handlers. A particular request handler is selected based on a type of order request. Specifically, each request handler is adapted to communicate with a particular back end system that will process the order data. Thus, depending on the type of order request (e.g., which back end system is needed), a particular request handler will be selected. Once the order request has been processed, the order request is forwarded to a receipt system that has a plurality of receipt handlers. Similar to the input system, a receipt handler is selected based on a particular protocol/format of the order request. Once selected, the receipt handler generates a receipt based on the processed order request in the protocol/format originally sent as the order request. Once generated, the receipt is forwarded back to the user.

A first aspect of the invention provides an order processing system, comprising: an input system for receiving and transforming an order request into order data, wherein the input system includes a plurality of input handlers, and wherein each input handler is adapted to receive and transform order requests having a particular format; a request system for processing the order data, the request system including a plurality of request handlers, wherein each request handler processes a unique type of order request; and a receipt system for generating an order receipt based on the processed order data, the receipt system including a plurality of output handlers, wherein each output handler generates an order receipt having a particular format.

A second aspect of the present invention provides an order processing system, comprising: an input system having an input interface and a plurality of input handlers, wherein the input system is adapted to select one of the input handlers based on information contained within an order request received by the input interface from a user; a request system in communication with the input system, wherein the request system has a plurality of request handlers, and wherein the request system is adapted to select one of the request handlers based on the information; and a receipt system in communication with the request system, wherein the receipt system has a plurality of output handlers for generating a receipt for the order request and for transmitting the receipt to the user, and wherein the receipt system is adapted to selected one of the output handlers based on the information.

A third aspect of the invention provides a method of processing an order, comprising: receiving an order request at an input system; selecting one of a plurality of request handlers in a request system based on a type of the order request; processing the formatted order request using the selected request handler; and generating an order receipt based on the processed order request at a receipt system.

A fourth aspect of the invention provides a computer program product comprising a computer useable medium having computer readable program code embodied therein for processing an order, the program product comprising: program code configured to receive an order request; program code configured to select one of a plurality of request handlers based on a type of the order request; program code configured to process the order request using the selected request handler; and program code configured to generate an order receipt based on the processed order request.

The exemplary aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the current invention provides order processing systems, methods, and program products that process a plurality of types of order requests. Specifically, a user creates an order request for a commercial transaction. The order request is received by an input system that has a plurality of input handlers. Based on a protocol and/or format of the order request, a particular input handler is selected. Specifically, each input handler is adapted to receive communications in a particular protocol/format. Once selected, the input handler will transform/convert the request into order data, and then forward the order data to a request system for processing. The request system has a plurality of request handlers. A particular request handler is selected based on a type of order request. Specifically, each request handler is adapted to communicate with a particular back end system that will process the order data. Thus, depending on the type of order request (e.g., which back end system is needed), a particular request handler will be selected. Once the order request has been processed, the order request is forwarded to a receipt system that has a plurality of receipt handlers. Similar to the input system, a receipt handler is selected based on a particular protocol/format of the order request. Once selected, the receipt handler generates a receipt based on the processed order request in the protocol/format originally sent as the order request. Once generated, the receipt is forwarded back to the user.

Figure 1:
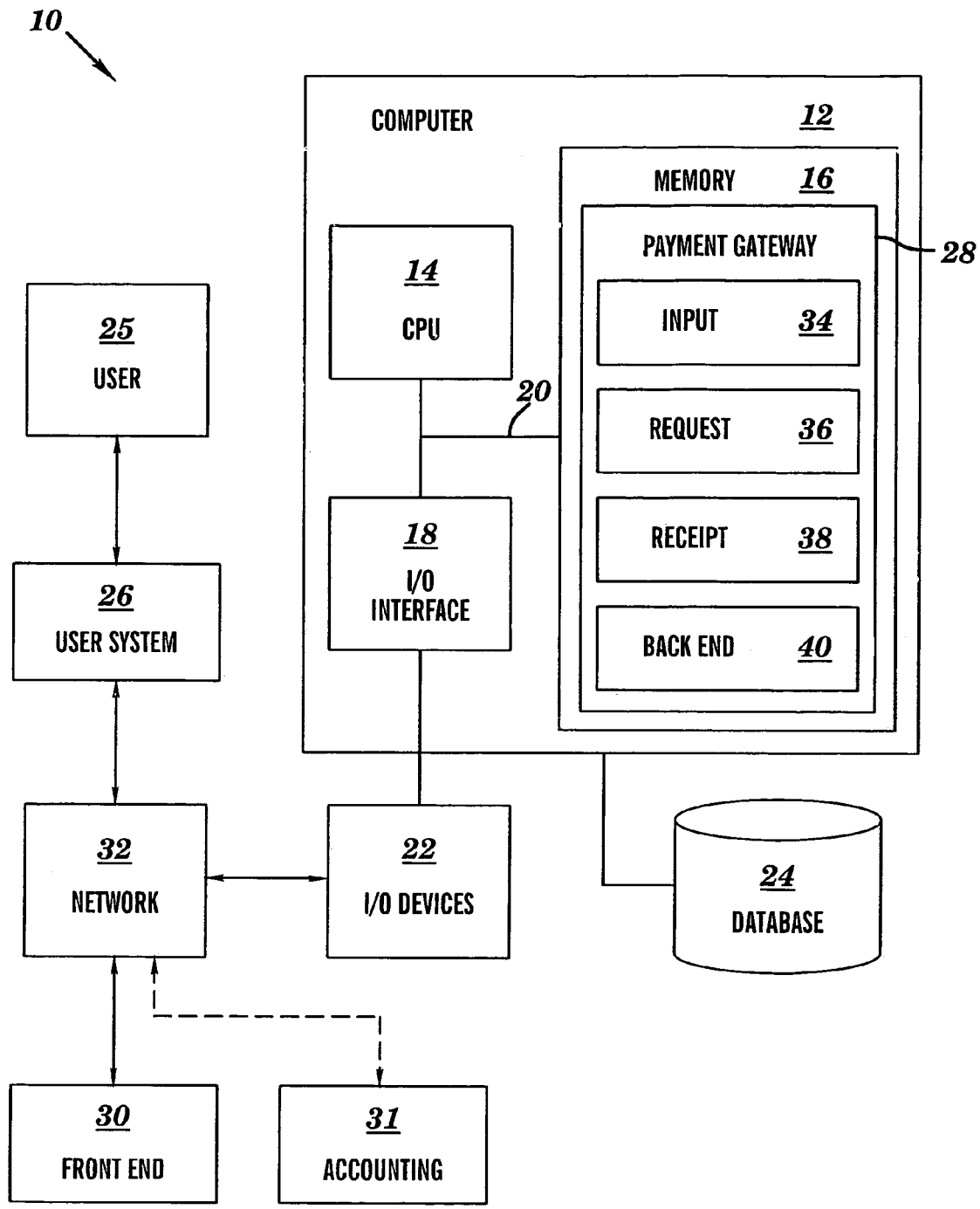
FIG. 1 depicts an order processing system according to one aspect of the invention.

Turning to the figures, FIG. 1 depicts an order processing system 10 according to one aspect of the invention. System 10 includes a computer 12 that generally comprises central processing unit (CPU) 14, memory 16, input/output (I/O) interface 18, bus 20, I/O devices 22 and database 24. Generally, a user 25 interacts with order processing system 10 through user system 26. In general, user system 26 is intended to represent any type of computerized system that can be used to access the world wide web (e.g., workstation, laptop, personal digital assistant, etc.). Moreover, front end system 30 is intended to represent a computerized system that provides access to a web site (e.g., a web server).

User system 26 and front end system 30 communicate with computer 12 by interfacing with one or more I/O devices 22 using a network 32. Communications between user system 26, computer 12, front end system 30, and/or network 32 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. As will be further described below, accounting system 31 can be optionally included, and can communicate with the various systems in a similar manner.

Computer 12 can comprise any general purpose or specific-use system utilizing standard operating system software, which is designed to drive the operation of the particular hardware and which is compatible with other system components and I/O controllers. CPU 14 may comprise a single processing unit, multiple processing units capable of parallel operation, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interface 18 may comprise any system for exchanging information with one or more I/O devices 22, including an I/O port (serial, parallel, ethernet, keyboard, mouse, etc.), an universal serial bus (USB) port, expansion bus, integrated drive electronics (IDE), etc. I/O devices 22 may comprise any known type of input/output device capable of communicating with I/O interface 18 with or without additional devices (i.e., expansion cards), including a network system, a modem, speakers, a monitor (cathode-ray tube (CRT), liquid-crystal display (LCD), etc.), hand-held device, keyboard, mouse, voice recognition system, speech output system, scanner, printer, facsimile, pager, storage devices, etc. Bus 20 provides a communication link between each of the components in computer 12 and likewise may comprise any known type of transmission link, including electrical, optical, wireless, etc. In addition, although not shown, additional components, such as cache memory, communication systems, system software, etc., may be incorporated into computer 12.

Database 24 may provide storage for information necessary to carry out the present invention as described in more detail below. As such, database 24 may include one or more storage devices, such as a magnetic disk drive or an optical disk drive. Further, database 24 can include data distributed across, for example, a LAN, WAN or a storage area network (SAN) (not shown). Database 24 may also be configured in such a way that one of ordinary skill in the art may interpret it to include one or more storage devices.

It is understood that although not shown, user system 26, front end system 30, and accounting system 31 typically contain components (e.g., CPU, memory, etc.) similar to computer 12. Such components have not been separately depicted and described for brevity purposes. These systems can comprise any type of device capable of accepting input, providing output, and communicating with another device. For example, user system 26 can be a mobile phone, a hand-held computer, a personal digital assistant, a portable (e.g., laptop) computer, a desktop computer, a mainframe computer, etc. while front end system 30 can be a web server, etc.

Payment gateway 28 is shown stored in memory 16 as computer program code. Payment gateway 28 includes an input system 34, a request system 36, a receipt system 38, and a back end system 40. However, it is understood that these systems can be implemented on a single computer (as shown)

or distributed across multiple computers. Additionally, while shown as a part of payment gateway 28, back end system 40 can be implemented as a separate system apart from payment gateway 28. The operation of each of these systems is described in more detail below.

Figure 2:
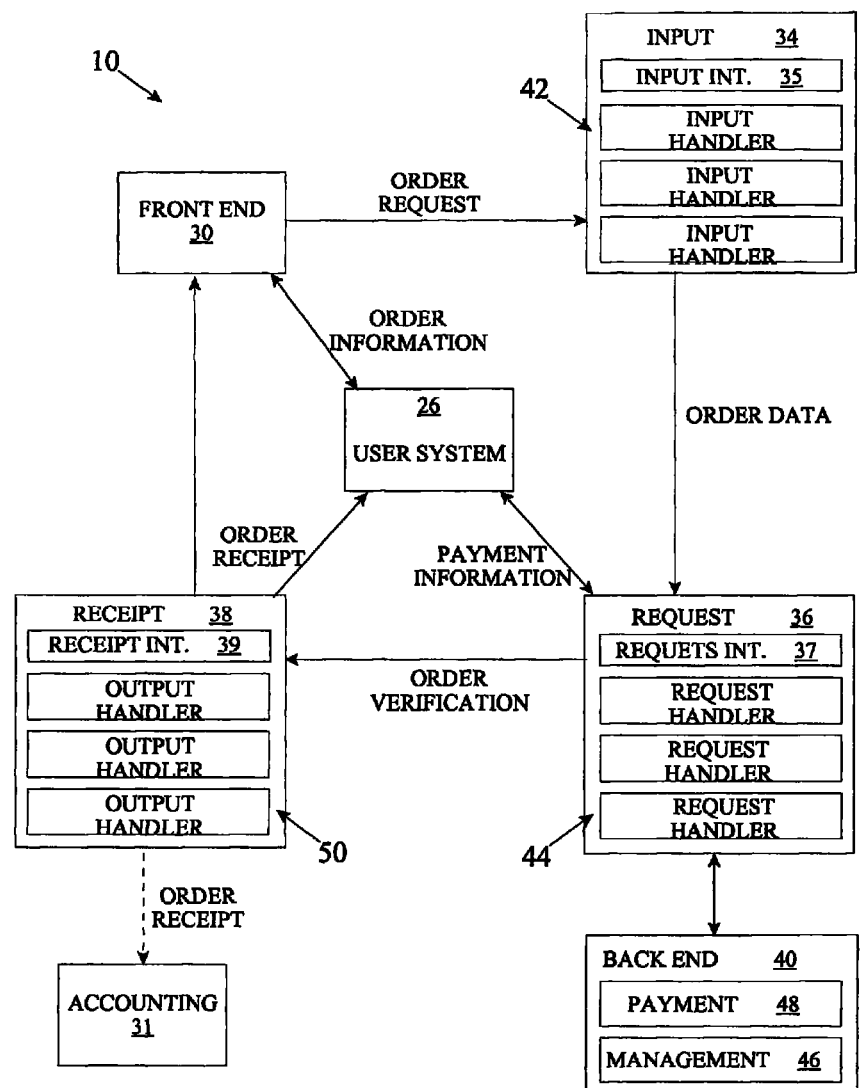
FIG. 2 depicts a data flow diagram for the order processing system of FIG. 1.

FIG. 2 depicts a data flow diagram for order processing system 10. Initially, a user interacts with user system 26 which is in communication with front end system 30 (e.g., web server) to determine order information. Front end system 30 provides a user interface that is displayed by user system 26. The user then inputs order information into user system 26, which is subsequently transmitted back to front end system 30. Order information can comprise any type of information related to a commercial transaction. For example, order information can include any combination of a selection of tangible goods, a selection of desired services, a registration renewal, a license renewal, a total cost, etc.

Once the entry of order information is complete, front end system 30 generates an order request based on the order information and forwards the order request to input interface 35 of input system 34. As will be further described below, the order request not only includes transactional information, but also format/protocol and type information so that the order request can be processed under the present invention. It is understood that although only one front end system 30 is shown, input system 34 can actually receive order requests from multiple front end systems 30. Moreover, front end system 30 can forward different "types" of order requests to input system 34. For example, one type of order request can be one that requires a particular back end system for being processed. Alternatively, a particular type of order request can be one that originated from a particular front end system 30. Still yet, the type of order request can be based on the type of commercial transaction (i.e., purchase of goods/service, license renewal, registration renewal) being conducted. In any event, while all order requests can be required to conform to a standard format/protocol (i.e., XML, HTML form fields, etc.), additional flexibility is provided in that input system 34 includes a plurality of input handlers 42. Each input handler 42 transforms/converts an order request having a particular format/protocol into order data that is useable by request system 36. Thus, the use of multiple input handlers 42 allows input system 34 to receive and process order requests in various formats/protocols. Specifically, when the order request is received by input interface 35, an appropriate input handler 42 is selected based on the format/protocol information in the order request. For example, if the order request is in XML, an XML-based input handler will be selected. Once selected, the XML-based input handler will transform/convert the order request into order data, and then forward the order data to request interface 37 of request system 36 for processing.

As shown, request system 36 includes a plurality of request handlers 44. Each request handler 44 processes a unique type of order request. That is, based on the "type" information in an order request, an appropriate request handler 44 is selected and the order request is processed. As indicated above, the type of order request can be based on many criteria. For example, the type of order request can be based on which back end system (e.g., management system 46 and/or payment system 48) will process the order data. For example, if back end system "A" is needed, request handler corresponding to type "A" could be selected. To this extent, each request handler 44 is adapted to communicate with at least one particular back end system for performing payment and order processing. In communicating with the back end systems, request handlers 44 could be required to process (e.g., convert/transform) the order data into a format/protocol useable by the particular back end program. Moreover, although not shown, it should be understood that request handlers 44 could perform various transaction processing functions themselves.

As is further shown in FIG. 2, back end system 40 includes two programs, namely, management system 46 for managing order requests (i.e., collecting payment information, address information, generating reports, etc.), and payment system 48 for processing payment information for the order requests (i.e., verification of funds, implementation of EFT transaction, etc.). It is understood that management system 46 and payment system 48 can be implemented as separate systems or a combined payment and order management system. It is also understood that back end programs such as those shown could be loaded on separate back end systems 40

Each request handler 44 may implement a varying amount of functionality to properly process order requests. For example, a front end system 30 can provide all the required payment information in the order request. In this case, request handler 44 verifies the payment information via back end system 40 and returns a result of the payment verification. Alternatively, a front end system 30 can provide only an amount to be paid and a user identification. In this case, request handler 44 communicates directly with provided user system 26 based on the user identification to retrieve payment information (e.g., credit card information, electronic funds transfer information, etc. stored as a cookie). Communication with user system 26 can alternatively be handled through input system 34 and/or receipt system 38. In any event, once the necessary information is retrieved, request handler 44 verifies this information and returns a result of the payment verification. This allows the collection of information and processing of the actual payment transaction to be isolated from front end system 30.

Once processing of the order request is complete, an order verification based on the processed order data is sent to a receipt interface 39 within receipt system 38. Receipt system 38 generates one or more order receipts based on the processed order data. Specifically, similar to input system 34, once the processed order data is received by receipt interface 39, a particular output handler 50 is selected based on a format/protocol of the original order request. The selected output handler 50 then generates and communicates the receipt in the same format/protocol that the original order request was sent. Thus, for example, if the original order request was received in XML, the transmitted order receipt will also be in XML.

Upon generating an order receipt, receipt system 38 forwards the order receipt to front end system 30. Since front end system 30 is another system, the order receipt can be provided in a manner convenient for extracting the data. However, when the order request includes a user identification, receipt system 38 also generates a second order receipt in the form of a user document and forwards it directly to user system 26 for display. The two paths help prevent the unauthorized manipulation of data, and help to ensure that front end system 30 receives verification without requiring any further action by the user. When desired, an order receipt also can be generated and forwarded to an alternate system designated in the order request, such as accounting system 31. This further prevents manipulation, and removes the requirement for transaction data to be stored at front end 30.

Figure 3:
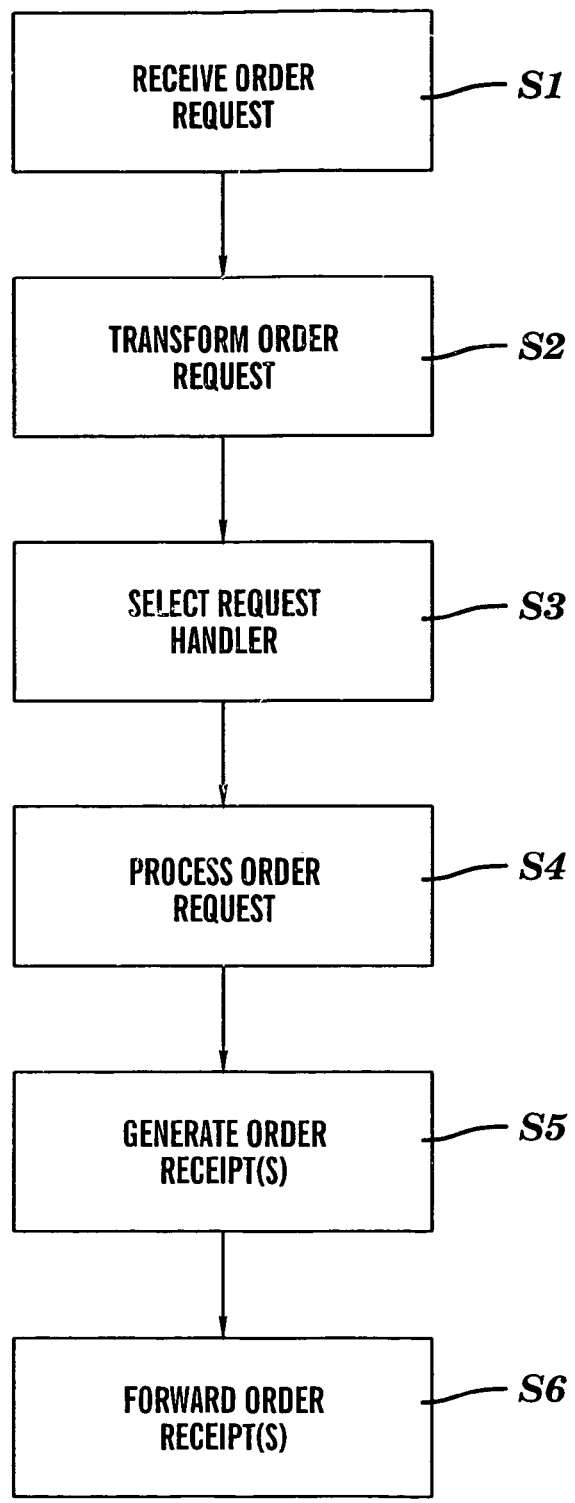
FIG. 3 depicts an illustrative method of implementing the invention.

FIG. 3 depicts an illustrative method of implementing the invention. Initially, an order request is received in step S1. As noted, various types of order requests can be received from numerous front end systems and can be in various formats/protocols. Consequently, the order request is transformed in step S2 into order data for processing. In step S3, an appropriate request handler is selected based on the type of order request. The request handler then processes the order request in step S4 with the assistance of an appropriate back end system. Upon completion, one or more order receipts are generated in step S5, and forwarded to the front end system, accounting system, and/or user system in step S6.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 12 such that it carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. An order processing system including at least one computing device, the at least one computing device comprising:
    an integrated input system for receiving and transforming an order request into order data, wherein the input system includes a plurality of input handlers, including a first input handler that receives order requests in a first format specific to the first input handler and a second input handler that receives order requests in a second format specific to the second input handler and that is different from the first format wherein the first and second input handlers transform the received order requests from their respective first and second formats into order data having a common output format;
    a request system for processing the order data, the request system including a plurality of request handlers, wherein each request handler processes a unique type of order request; and
    a receipt system for generating an order receipt based on the processed order data, the receipt system including a plurality of output handlers, wherein each output handler is adapted to generate an order receipt having a format that is unique from each of the other output handlers.

2. The system of claim 1, the at least one computing device further comprising a front end system for generating the order request.

3. The system of claim 2, wherein the receipt system further forwards the order receipt to the front end system.

4. The system of claim 1, wherein the order request includes a user identification, and wherein the receipt system further forwards the order receipt to a user system based on the user identification.

5. The system of claim 1, wherein the order request includes format and type information, wherein a particular input handler and output handler is selected based on the format information, and wherein a particular request handler is selected based on the type information.

6. The system of claim 1, wherein an input handler and an output handler are selected based on a protocol of the order request.

7. The system of claim 1, the at least one computing device further comprising a back end system in communication with the order system, the back end system for performing payment and order processing.

8. The system of claim 7, wherein the back end system includes a management system for managing the order requests.

9. The system of claim 7, wherein the back end system includes a payment system for processing payment information for each order request.

10. The system of claim 1, wherein the receipt system further generates a second order receipt different from the order receipt, the second order receipt comprising a user document configured for display to a user.

11. The system of claim 1, wherein the receipt system forwards the order receipt to a front end system, generates a second order receipt different from the order receipt, and forwards the second order receipt to an alternate system different from the front end system that is designated in the order request.

12. The system of claim 11, wherein the alternate system comprises an accounting system.

13. The system of claim 11, wherein the alternate system comprises a user system.

14. The system of claim 1, wherein one of the plurality of request handlers is selected to process the order data based on a back end system that is configured to process the order data.

15. The system of claim 14, wherein the selected request handler is configured to transform the order data into a format useable by the back end system, and provide the transformed data for processing by the back end system.

* * * * *